Patented Jan. 17, 1950

2,494,966

UNITED STATES PATENT OFFICE 2,494,966

WATER SOLUBLE SULFIDES CONTAINING ACYLATED AMINO GROUPS AND PROCESS OF PREPARING SAME

Richard Sallmann, Gelterkinden, Switzerland, assignor to Ciba Limited, Basel, Switzerland, a Swiss firm No Drawing. Application June 14, 1945, Serial No. 599,513. In Switzerland July 13, 1944

10 Claims. (Cl. 260—401)

According to the present invention new condensation products are obtained by condensing amides containing at least one hydrogen atom attached to at least one amide nitrogen atom, mercaptans, and aldehydes or acetals thereof containing at least two carbon atoms connected together uninterruptedly, especially those with alcohols of low molecular weight, with one another, and, if desired, introducing groups imparting solubility in water into the resulting condensation products according to known methods.

The amides to be used as starting materials may be derived from carboxylic acids as well as from sulfonic acids, further from ammonia and its basic mono-substitution products. They may therefore represent, for example, carboxylic acid amides, urethanes, ureas, hydrazides or sulfamides.

As starting materials there can be used, for example, amides which are derived from aliphatic, aromatic, aliphatic-aromatic, cycloaliphatic and heterocyclic carboxylic acids. As examples there are named formic acid, acetic acid, propionic acid, acrylic acid, butyric acid, caprylic acid, lauric acid, cocoanutoil fatty acid, palmitic acid, stearic acid, oleic acid, linoleic acid, hardened train oil fatty acid, maleic acid, adipic acid, further benzoic acid, naphthoic acid, para-stearoylaminobenzoic acid, hexahydrobenzoic acid, tetrahydronaphthylacetic acid, resin acids or naphthenic acids, such as abietic acid, further chloroacetic acid, chloromethylbenzoic acid, chloropropionic acid, glycolic acid. Suitable starting materials, besides primary amides, are also the N-substitution products resulting from the foregoing compilation which still contain at least one hydrogen atom attached to the nitrogen atom, such as N-methyl-, N-ethyl-, N-hydroxyethyl-, N-dihydroxypropyl- or N-phenyl lauric acid amide. Secondary amides such as dibenzamide can also be used, further N:N'-diacylated methylene diamides, such as N:N'-di-stearoylmethylenediamine. As starting materials there can be further named cyclic amides, such as phthalimide and diketopiperazine. As amides of the urea group there can be used, for example, urea, monoethyl-, monophenyl-, monododecyl-, monooctadecyl-, N:N'-didodecylurea; as amides of the urethane group, for example, octadecylurethane, further diurethanes, such as methylenedioctadecylurethane. Among the amides used as starting materials mention is made of thiourea, dicyandiamide, and melamine. As amides of the hydrazide group there are named, for example, the hydrazides corresponding to the above indicated amides, such as lauric acid hydrazide. As amides of the sulfamide group there are mentioned, for example, aromatic sulfamides, further amides obtained from paraffin hydrocarbons by treating with chlorine and sulfur dioxide and radiation with ultraviolet light and subsequent action of ammonia or primary amines.

As mercaptans there can be used, for example, ethyl-, hydroxyethyl-, 2:3-dihydroxypropyl- or hexadecyl-mercaptan, further mercaptans containing an acid group imparting solubility in water, such as thioglycolic acid, β-mercaptoethane sulfonic acid or its salts. Mercaptans of the last named type, that is mercaptans containing a carboxylic acid group or a sulfonic acid group, are especially valuable starting materials for the present process.

Among the aldehydes which are to be used as starting materials there are named, for example, the following: acetaldehyde, propionic aldehyde, butyric aldehyde, lauric aldehyde, chloral, benzaldehyde, furfurol; particularly however unsaturated aldehydes, especially those having at least one reactive double bond, e. g. in an aliphatic chain, such as acrolein, crotonic aldehyde or cinnamic aldehyde; further aldehydes having groups imparting or enhancing the solubility in water, such as acetaldehyde sulfonic acids, butyric aldehyde sulfonic acid, benzaldehyde sulfonic acids or hydroxyaldehydes or their semi-acetals, for example, reducing sugars such as monosaccharides (1-arabinose, d-glucose) or reducing disaccharides (maltose), further hydroxybenzaldehydes; finally aldehydes containing a substituent convertible into a group imparting solubility in water, e. g. chloroacetaldehyde.

The reaction according to the present process can be brought about by mixing the reaction participants, advantageously in the heat, for example at 60–100° C., if desired in the presence of solvents, such as water, methanol, ethyl alcohol, acetone, dioxane or glacial acetic acid, and acids which may act as catalysts, such as acetic acid or hydrochloric acid. The various starting materials may be caused to react either simultaneously or subsequently.

If at least one of the reaction components used in the present process, e. g. the aldehyde, contains a reactive double linkage, the mercaptan may be added to the double linkage in the reaction, provided the quantity of mercaptan used suffices also for this additive reaction, that is at least two mols of mercaptan for each mol of unsaturated aldehyde. Particularly valuable are those addition products which are formed if the mercaptan contains a group imparting solubility in water, for example, a carboxylic acid or sulfonic acid group.

If desired, groups imparting solubility in water or further groups imparting solubility in water can be introduced in known manner into the products of the present process which, depending on the choice of the starting materials, are insoluble in water or, as the case may be, only soluble in the form of alkali salts. For example, bisulfites, that is primary sulfites, such as primary alkali-sulfites, can be added to products of the present process containing reactive double linkages. If the products contain reactive halogen atoms, they can be converted in known manner into sulfonic acid groups, thiosulfuric acid ester groups or into quaternary ammonium groups by the action of sulfites, thiosulfates, or tertiary amines. Similarly, the products of the invention having hydroxyl groups can be converted into sulfuric acid esters or salts thereof according to known processes.

The products of the invention may be designated as sulfides of the general formula

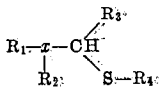

wherein $R_1$ is a member selected from the group consisting of hydrocarbon radicals and substituted hydrocarbon radicals, $x$ is a member selected from the group consisting of

and

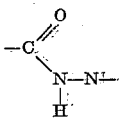

and is bound with the carbon atoms of its carbonyl group to the radical $R_1$, $R_2$ is a member selected from the group consisting of hydrogen and hydrocarbon radicals, $R_3$—CH< is an aldehyde radical which contains at least two connected carbon atoms and in which the two free valencies replace the oxygen atom of an aldehyde of the formula

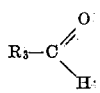

and wherein —S—$R_4$ is the monovalent radical of a mercaptan containing at least one water-solubilizing group, which sulfides are liquid to solid substances which are soluble in water. $R_2$ of the general formula given above may represent, for instance, alkyl or aryl radicals. Alkylidene radicals, such as $CH_3$—CH<, $CH_2$=CH—CH< and $CH_3$—CH=CH—CH<, and further aralkylidene radicals, such as

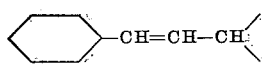

are examples of aldehyde radicals $R_3$—CH< in which the two free valencies replace the oxygen atom of an aldehyde of the formula

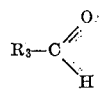

In these examples $R_3$ means alkyl (including unsaturated alkyl such as propenyl) or aralkyl (including aralkyl with an unsaturated linkage in the open chain); however, $R_3$ may also stand for substituted alkyl or for aryl. Among the —S—$R_4$ radicals the most valuable ones are those in which $R_4$ represents alkyl containing an acid salt-forming water-solubilizing group, for instance, a —COOH or a —$SO_3H$ group. The general formula given above includes products of the following formulas:

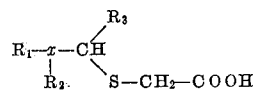

($R_1$, $R_2$, $x$ and $R_3$—CH< having the same meaning as indicated above),

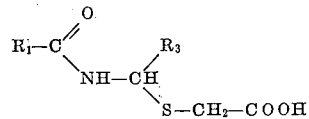

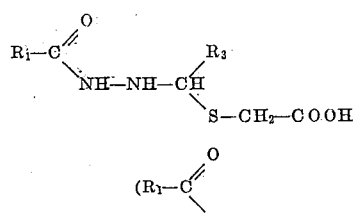

representing in both formulas the acyl radical of a fatty acid with at least twelve carbon atoms and $R_3$—CH< having the same meaning as above).

The products of the invention can be used, for example, as textile assistants. The water-soluble products which contain an aliphatic or cycloaliphatic radical with at least 8 carbon atoms may find application, for example, as wetting, dispersing, washing or softening agents or as dyeing assistants, further as agents for preventing the agglomeration of the cellulose wool fibrils in the manufacturing process. They are distinguished in many cases by a good stability towards constituents imparting hardness to water and to dilute organic acids. Especially valuable are those products of the invention which contain at least one acyl radical of an aliphatic carboxylic acid with at least 12 carbon atoms; for instance, with 16–18 carbon atoms. Products of this type possess pronounced wetting and washing properties. Water-soluble products of the invention containing radicals with less than 8 carbon atoms may be used as wetting agents in concentrated aqueous solutions of electrolytes, if necessary in presence of dispersing agents, such as phenols in the case of strongly concentrated alkali hydroxide solutions. The products can be used alone or in combination with other substances usually employed with textile assistants.

The following examples illustrate the invention, the parts being by weight unless otherwise stated:

*Example 1*

11.2 parts of the amide from technical stearic acid and 5.5 parts of thioglycolic acid are melted together. 3.7 parts of freshly distilled crotonic aldehyde are gradually added, while stirring, at a water-bath temperature of 90–100° C., and stirring is continued for 90 minutes at the same temperature. After addition of sodium carbonate a test-portion is clearly soluble in water. The reaction mass is poured into water, sodium carbonate is added, while heating, until the reaction is feebly alkaline, and the clear solution is evaporated to dryness in a vacuum. In case the product is to be freed from the small excess of thioglycolic acid and crotonic aldehyde, the aqueous solution is mixed with mineral acid, whereupon the carboxylic acid formed is precipitated and the thioglycolic acid remains in solution. The precipitated acid of the formula

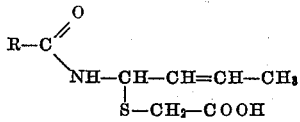

wherein

stands for the acyl radical of technical stearic acid, is taken up in ether, washed with water until the acid reaction disappears, and dried with dehydrated Glauber's salt, whereupon a semi-solid mass is obtained after distilling off the ether and drying in a vacuum. The sodium salt obtained, for example, by neutralizing with sodium hydroxide solution forms a yellowish powder which is clearly soluble in water. The aqueous solution foams strongly, is stable towards hard water and remains clear after neutralizing with acetic acid. When supersaturated with acetic acid slight turbidity occurs, and when acidified with mineral acid the new condensation product is precipitated as free carboxylic acid in a semi-solid state. The sodium salt is a suitable washing agent for wool containing suint. Instead of technical stearic acid amide butyric acid amide, or N-methyl-stearic acid amide or ricinoleic acid amide may be used as starting materials. Further thioglycolic acid may be replaced by β-mercaptoethane sulfonic acid. Instead of crotonic aldehyde its dimethyl acetal may be used.

Example 2

8 parts of the amide from technical cocoanut oil fatty acid are stirred for 20 minutes with 3.7 parts of freshly distilled crotonic aldehyde at a water-bath temperature of 90–100° C., preferably with exclusion of air. 5.5 parts of thioglycolic acid are then added. After continuing stirring for 30 minutes at 80–90° C., a test portion of the product is clearly soluble in dilute sodium carbonate solution. For the purpose of working up, the reaction product can be poured into water, neutralized with sodium carbonate or caustic soda solution, evaporated to dryness in a vacuum, or at first precipitated as free carboxylic acid of the formula

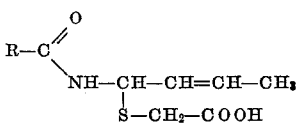

wherein

is the acyl radical of technical cocoanut oil fatty acid, for further purification as indicated in Example 1. The sodium salt forms a feebly yellow colored soft mass which is clearly soluble in water. The aqueous solution is stable towards hard water and suitable as washing and foaming agent.

Example 3

2.8 parts of freshly distilled acrolein are added at 60–65° C. in the course of 10 minutes to a melt consisting of 11.2 parts of the amide from technical stearic acid and 9 parts of thioglycolic acid. The mixture is stirred for 90 minutes at a water-bath temperature of 80–85° C., whereupon a test-portion is clearly soluble in dilute sodium carbonate solution. The reaction product of the formula

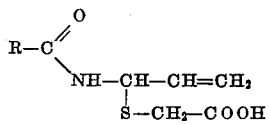

wherein

stands for the acyl radical of technical stearic acid, is poured into water, neutralized with caustic soda solution and evaporated to dryness. There is obtained a white powder which is clearly soluble in water. The aqueous solution is stable towards hard water, foams strongly and is a suitable washing agent for wool containing suint.

The new carboxylic acid can be precipitated as a semi-solid mass from the aqueous solution by means of mineral acid.

Example 4

14.2 parts of the amide from technical stearic acid and 11 parts of thioglycolic acid are melted together, and 5 parts of cinnamic aldehyde are run in at 90–100° C. in the course of 10 minutes, while stirring. The mixture is then further heated for 20 hours to 90–100° C., without stirring, whereupon a test portion is clearly soluble in dilute sodium carbonate solution. The reaction product which is obtained as a yellow colored wax can be worked up as described in the foregoing examples. It corresponds to the formula

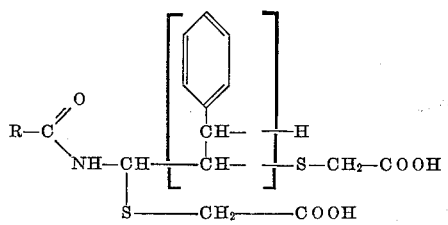

wherein

stands for the acyl radical of technical stearic acid. This type of formula is used in order to indicate that the relative position of —H and —S—CH₂—COOH which are attached to the

—CH—CH— group is not known.

Example 5

11.3 parts of technical stearic acid amide, 6 parts of thioglycolic acid and 8.6 parts of anhydrous glucose are stirred for 6 hours at 90–100° C. The reaction mass of the formula

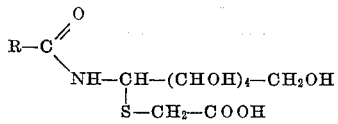

is then clearly soluble in dilute sodium carbonate solution.

Example 6

14.2 parts of the amide from technical stearic acid and 6.9 parts of thioglycolic acid are melted together. After cooling the solidified mass is comminuted and heated with 2.8 parts of freshly distilled acetaldehyde in an autoclave for 3 hours to 90–100° C. The reaction product represents a white waxy mass of the formula $$R-C\underset{NH-CH-CH_3}{\overset{O}{\diagup}}$$
$$\qquad\qquad\quad |$$
$$\qquad\qquad S-CH_2-COOH$$

wherein $$R-C\overset{O}{\diagup}$$

stands for the acyl radical of technical stearic acid, which is clearly soluble in dilute sodium carbonate solution.

The product can be worked up according to the data in the last preceding example. The aqueous solutions of the sodium salt possess pronounced capillary active properties. They are suitable as washing agents and are more stable towards hard water and organic acids than the salts of the higher fatty acids.

Example 7

3.5 parts of butyric aldehyde are slowly added at 85–90° C., while stirring, to a melt consisting of 11.3 parts of the amide from technical stearic acid and 5.5 parts of thioglycolic acid. After stirring for 6 hours at 90–100° C. a test portion is clearly soluble in water after addition of sodium carbonate. The waxy reaction product of the formula $$R-C\underset{NH-CH-CH_2-CH_2-CH_3}{\overset{O}{\diagup}}$$
$$\qquad\qquad\quad |$$
$$\qquad\qquad S-CH_2-COOH$$

wherein $$R-C\overset{O}{\diagup}$$

stands for the acyl radical of technical stearic acid, can be worked up according to the data in the preceding examples.

Example 8

6 parts of the condensation product from technical stearic acid, crotonic aldehyde and thioglycolic acid obtained as described in Example 1 are heated with 4 parts of thioglycolic acid for 15 hours on the steam bath. The product is then washed several times with water in the heat, taken up in ether, the ethereal solution is washed until the reaction is no longer acid, and dried. After distilling off the ether there is obtained a soft mass of the formula $$R-C\overset{O}{\diagup}\underset{NH-CH-\begin{bmatrix}CH_3\\|\\CH-\end{bmatrix}-H}{}$$
$$\qquad\qquad\qquad\qquad -S-CH_2-COOH$$
$$\qquad\qquad |$$
$$\qquad\qquad S----CH_2----COOH$$

wherein $$R-C\overset{O}{\diagup}$$

stands for the acyl radical of technical stearic acid. This type of formula is used in order to indicate that the relative position of —H and —S—CH$_2$—COOH which are attached to the $$-CH-CH-$$
$$|\quad\ |$$

group is not known. The mass is clearly soluble in dilute alkalies.

Example 9

1.2 parts of the condensation product from stearic acid amide, acrolein and thioglycolic acid described in Example 3 are heated for 15 hours on the steam bath with 1.0 part of thioglycolic acid. The oily reaction mass is then washed several times with warm water, the residue is taken up in ether, the ethereal solution is washed with water until the reaction is no longer acid, and dried. After distilling off the ether and drying in a vacuum at 60–70° C. there is obtained a waxy mass of the formula $$R-C\overset{O}{\diagup}\underset{NH-CH-\begin{bmatrix}CH_2-\\|\\CH-\end{bmatrix}-H}{}$$
$$\qquad\qquad\qquad\qquad -S-CH_2-COOH$$
$$\qquad\qquad |$$
$$\qquad\qquad S----CH_2----COOH$$

wherein $$R-C\overset{O}{\diagup}$$

stands for the acyl radical of technical stearic acid. This type of formula is used in order to indicate that the relative position of —H and —S—CH$_2$—COOH which are attached to the $$-CH-CH-$$
$$|\quad\ |$$

group is not known. The mass is clearly soluble in dilute alkalies.

Example 10

7 parts of a sodium bisulfite solution of 40 percent strength are poured onto 1 part of the condensation product from stearic acid amide, thioglycolic acid and crotonic aldehyde obtained as described in Example 1, and the whole is heated for 3 hours on the steam bath, while frequently stirring. A homogeneous, clear, gelatinous mass is thus obtained. This is diluted with 2 parts of water, small quantities of solid constituents are removed by filtration, the solution is mixed with a concentrated sodium chloride solution and acidified with dilute hydrochloric acid.

The precipitated acid is filtered, washed with dilute sodium chloride solution, taken up in water, neutralized with sodium carbonate and evaporated to dryness in a vacuum. It corresponds to the formula $$R-C\overset{O}{\diagup}\underset{NH-CH-\begin{bmatrix}CH_3\\|\\CH-\end{bmatrix}-H}{}$$
$$\qquad\qquad\qquad\qquad -SO_3H$$
$$\qquad\qquad |$$
$$\qquad\qquad S----CH_2----COOH$$

wherein $$R-C\overset{O}{\diagup}$$

stands for the acyl radical of technical stearic acid. This type of formula is used in order to indicate that the relative position of —H and —S—CH$_2$—COOH which are attached to the $$-CH-CH-$$
$$|\quad\ |$$

group is not known. A white powder is thus obtained which is clearly soluble in water. The aqueous solution foams strongly, it is stable towards hard water and remains clear after addition of mineral acids.

The new product can be used as washing agent for wool containing suint.

*Example 11*

3 parts of the condensation product from stearic acid amide, acrolein, and thioglycolic acid described in Example 3 are heated for 3 hours to 90–100° C. with 20 parts by volume of a sodium bisulfite solution of 40 per cent strength and 2 parts of water, while stirring. A concentrated sodium chloride solution is then added and the new sulfonic acid is precipitated with dilute hydrochloric acid. After filtering there is obtained a white, paraffin-like mass which dissolves in dilute sodium carbonate solution. The solution remains clear after acidifying with mineral acid.

*Example 12*

1.9 parts of a condensation product obtained by heating cocoanut oil fatty acid hydrazide with anhydrous glucose in absolute alcohol in the presence of boric acid, are heated for 20 minutes with 2 parts of thioglycolic acid on the steam bath. After removing the thioglycolic acid in excess with ether the product of the formula

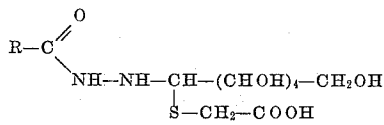

wherein

is the acyl radical of technical cocoanut oil fatty acid, is dissolved in alcohol, neutralized with caustic soda solution and evaporated to dryness. A yellowish powder is obtained which is easily soluble in water. The aqueous solution exhibits an excellent foaming capacity. Decomposition does not occur even when adding mineral acid in the heat.

*Example 13*

30 parts of stearic acid hydrazide, 10 parts of crotonic aldehyde and 10 parts of absolute alcohol are heated to boiling for 20 minutes. 30 parts of thioglycolic acid are then added and the clear solution is heated under reflux for 80 minutes on the steam bath. In order to remove the thioglycolic acid in excess the condensation product of the formula

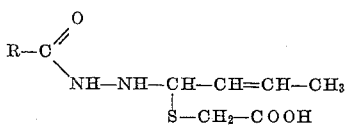

wherein

stands for the acyl radical of technical stearic acid, is washed several times with warm water. The residue is dissolved in alcohol, neutralized with caustic soda solution, whereupon a yellowish powder is obtained after evaporating the alcohol. When precipitating the free acid from the aqueous solution with mineral acid, values are obtained by titration from which the presence of a monocarboxylic acid can be inferred. When prolonging heating with thioglycolic acid in excess to 15 hours, there is obtained a dicarboxylic acid.

Instead of crotonic aldehyde its dimethyl acetal may be used.

*Example 14*

For washing wool yarn a bath is prepared containing per liter of water 1 gram of the product obtained according to Example 1 or 10. The yarn is moved in the bath (liquor ratio 1:20) for ½ hour at 45° C. and rinsed. After this treatment the wool is very clean and can be dyed offhand.

What I claim is:

1. Process for the manufacture of condensation products, which comprises heating a primary amide of an aliphatic carboxylic acid having 12 to 18 carbon atoms with thioglycolic acid and with an unsaturated aliphatic aldehyde selected from the group consisting of crotonic aldehyde and acrolein at a temperature of 60°–100° C. until the reaction product is soluble in dilute sodium carbonate solution and heating the so-obtained condensation product with a water-soluble primary sulfite to a temperature of 60°–100° C. until the reaction product is homogeneous.

2. Process for the manufacture of condensation products, which comprises heating a monoamide containing at least one hydrogen atom bound to an amide nitrogen atom and one acyl radical of an aliphatic carboxylic acid having 12 to 18 carbon atoms with thioglycolic acid and with an unsaturated aliphatic aldehyde selected from the group consisting of crotonic aldehyde and acrolein at a temperature of 60°–100° C. until the reaction product is soluble in dilute sodium carbonate solution.

3. Process for the manufacture of condensation products, which comprises heating one mol of a primary amide of an aliphatic carboxylic acid having 12 to 18 carbon atoms with one mol of thioglycolic acid and with one mol of an unsaturated aliphatic aldehyde selected from the group consisting of crotonic aldehyde and acrolein at a temperature of 60°–100° C. until the reaction product is soluble in dilute sodium carbonate solution.

4. Process for the manufacture of a condensation product, of the formula

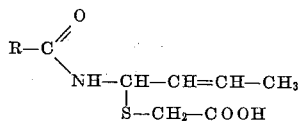

wherein

is the acyl radical of technical stearic acid, which comprises heating one mol of technical stearic acid amide with one mol of thioglycolic acid and one mol of crotonic aldehyde at a temperature of 60°–100° C. until the reaction product is soluble in dilute sodium carbonate solution.

5. Process for the manufacture of a condensation product of the formula

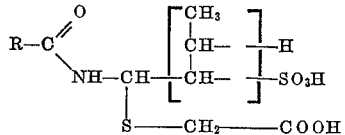

wherein

is the acyl radical of technical stearic acid, which comprises heating one mol of technical stearic acid amide with one mol of thioglycolic acid and one mol of crotonic aldehyde at a temperature of 60°–100° C. until the reaction product is soluble in dilute sodium carbonate solution and thereupon heating the thus-obtained condensation product to a temperature of 60°–100° C. until the reaction product is homogeneous.

6. A sulfide of the formula

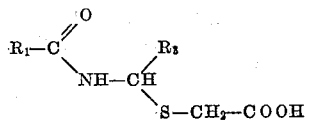

wherein

is the acyl radical of a fatty acid with 12 to 18 carbon atoms, and wherein $R_3$—CH< is a radical of an open chain aldehyde containing 3 to 4 connected carbon atoms and in which the two free valencies replace the oxygen atom of said aldehyde.

7. A sulfide of the formula

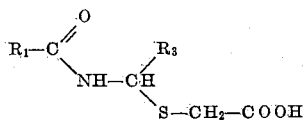

wherein

is the acyl radical of a fatty acid with 12 to 18 carbon atoms, and wherein $R_3$—CH< is an open chain aldehyde radical which contains 3 to 4 connected carbon atoms and at least one double bond, and in which the two free valencies replace the oxygen atom of an aldehyde of the formula

8. The sulfide of the formula

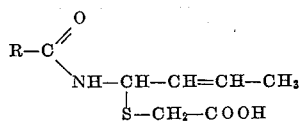

wherein

is the acyl radical of technical stearic acid.

9. A sulfide of the formula

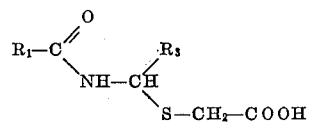

wherein

is the acyl radical of a fatty acid with 12 to 18 carbon atoms, and wherein $R_3$—CH< is an aldehyde radical which contains 3 to 4 connected carbon atoms, and a sulfonic acid group and in which the two free valencies replace the oxygen atom of an aldehyde of the formula

10. The sulfide of the formula

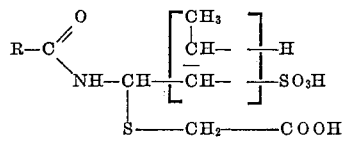

wherein

is the acyl radical of technical stearic acid.

RICHARD SALLMANN.

REFERENCES CITED

The following references are of record in the file of this patent:

UNITED STATES PATENTS

| Number | Name | Date |
|---|---|---|
| 2,337,220 | Albrecht et al. | Dec. 21, 1943 |

Certificate of Correction

Patent No. 2,494,966 January 17, 1950

RICHARD SALLMANN

It is hereby certified that errors appear in the printed specification of the above numbered patent requiring correction as follows:

Column 5, line 35, after "amide", second occurrence, strike out the comma and insert the same after "amide", first occurrence, same line; column 7, lines 66 to 68 inclusive, for that portion of the formula reading

column 12, lines 31 to 33, inclusive, for that portion of the formula reading

and that the said Letters Patent should be read with these corrections therein that the same may conform to the record of the case in the Patent Office.

Signed and sealed this 16th day of May, A. D. 1950.

[SEAL]

THOMAS F. MURPHY,
*Assistant Commissioner of Patents.*